M. C. SHEA.
WHEEL.
APPLICATION FILED MAY 5, 1910.
977,559.
Patented Dec. 6, 1910.
2 SHEETS—SHEET 1.
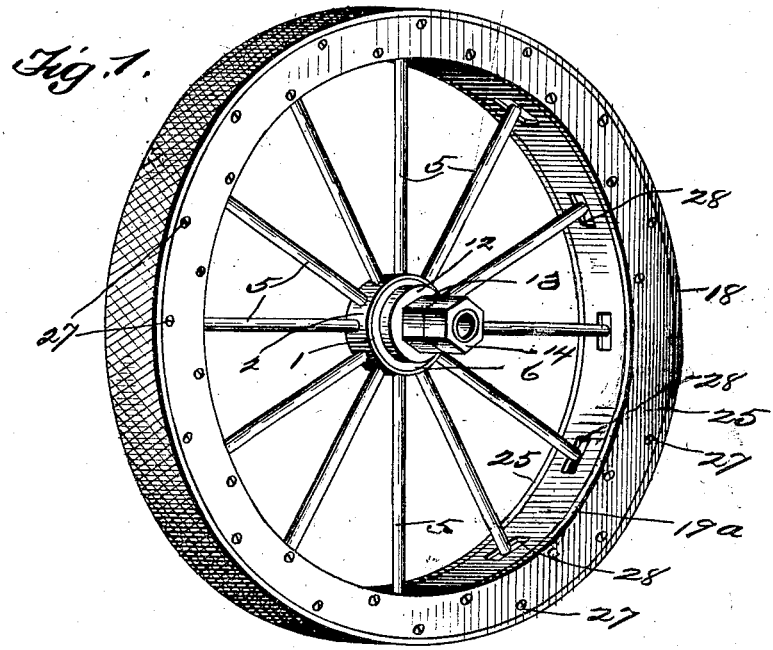
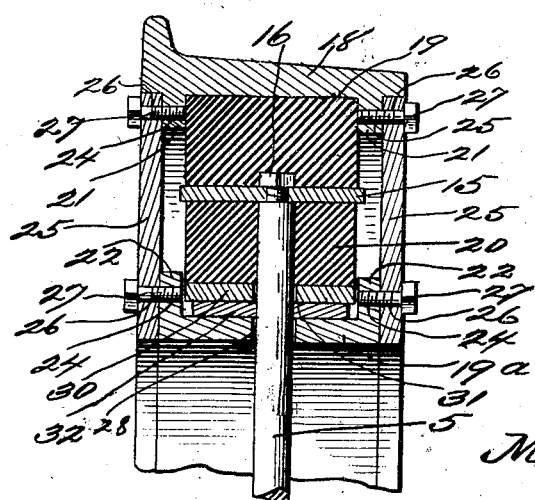
Witnesses
Francis G. Boswell
L. V. White
Inventor
M. C. Shea
By D. Swift &Co.
Attorneys

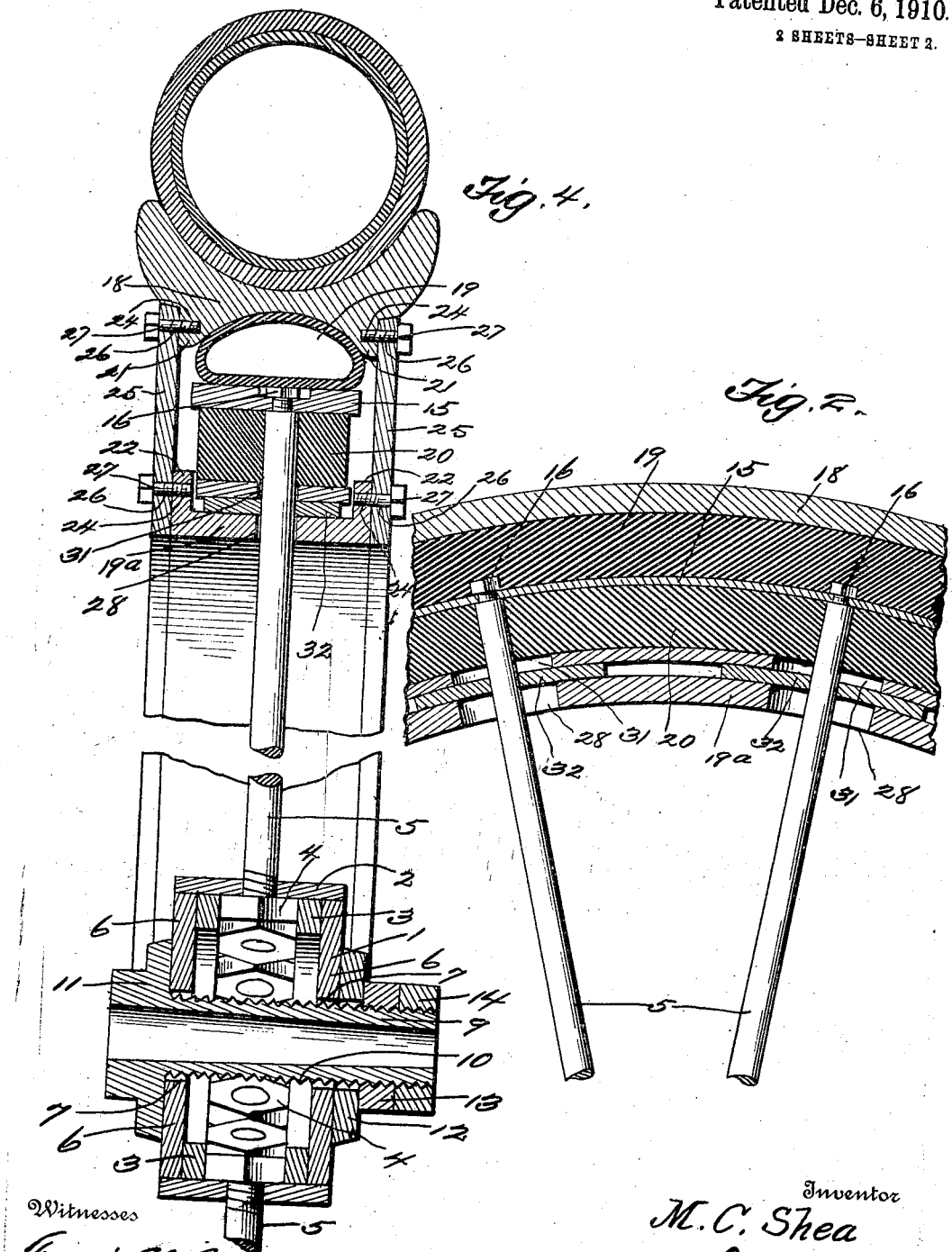

UNITED STATES PATENT OFFICE.

MICHAEL C. SHEA, OF MISHAWAKA, INDIANA.

WHEEL.

977,559.

Specification of Letters Patent.   Patented Dec. 6, 1910.

Application filed May 5, 1910.   Serial No. 559,639.

*To all whom it may concern:*

Be it known that I, MICHAEL C. SHEA, a citizen of the United States, residing at Mishawaka, in the county of St. Joseph and State of Indiana, have invented a new and useful Wheel; and I do hereby declare the following to be a full, clear, and exact description of the invention, such as will enable others skilled in the art to which it appertains to make and use the same.

This invention pertains to a new and useful wheel, and the principle in view, is to provide a wheel having two rims spaced apart, intermediate of which a resiliently mounted rim is arranged, which intermediate rim moves with the hub and spokes of the wheel, for instance, when pressure is applied upon the hub, the intermediate rim yields incident to the applied pressure.

A further feature of the invention is the production of a novel structure, for connecting the spokes of the wheel to the hub. This hub comprises a band having disposed upon its inner circumference two rings spaced apart by means of the nuts carried by the spokes, and with which rings plates engage. These plates are held in place by the bushing and the nuts, as shown in the drawings.

The resilient means which is disposed upon each side of the intermediate rim, and between the inner and outer rims, may be made of solid rubber, or in the form of a pneumatic tube, it being understood, however, that springs may be arranged in place of the solid rubber or pneumatic tube. This wheel may be constructed for use as a traction wheel upon a traction engine, or upon a locomotive, as shown in the drawings. The wheel may also be made applicable upon an automobile, or any other vehicle.

In the drawings, a certain form of device is disclosed, but in experimenting and reducing to practice this form of device, if the applicant finds it necessary to alter various parts thereof, for instance, the details of the structure, he is entitled to do so, provided the alterations fall within the scope of the appended claims.

In the drawings:—Figure 1 is a perspective view of a wheel embodying the features of the invention, and showing the wheel in the form of a traction wheel. Fig. 2 is a sectional view through the wheel to show the interior structure. Fig. 3 is a cross sectional view through a wheel showing the outer rim in a contour corresponding to a locomotive wheel. Fig. 4 is a sectional view through a portion of the wheel, showing pneumatic tubes in place of the solid rubber, and further disclosing a rubber tire carried by the outer rim of the wheel, in order that the wheel may be applicable to an automobile.

Referring to the annexed drawings, 1 denotes the hub of the wheel, which consists of an annular band 2, on the inner circumference of which two annular collars or rings 3 are disposed. These rings or collars are held spaced apart by means of the nuts 4, which are threaded upon the inner ends of the spokes 5. These spokes are threaded into the annular band. Also fitted within the annular band, from each side thereof, and in order to engage the collars or rings are annular plates 6. These annular plates 6 are apertured as shown at 7, and extending through the apertures (which are in registration) is a sleeve or bushing 9, entirely threaded, as shown at 10. This bushing or sleeve at one end is provided with a head portion 11, and to the other end a washer and nut 12 and 13 are threaded. Also threaded to the end of the bushing or sleeve is a lock nut 14, in order to hold the parts securely together. In each of the various forms of wheels, as shown in the drawings, the structure of the hub is identical.

15 denotes a resiliently mounted rim or band; to which the free ends of the spokes are connected, by means of the nuts 16 and the shoulders 17. This rim or band is disposed between an inner and outer rim or band 18 and 19$^a$. Adjacent to the inner and outer faces of the rim 15, solid rubber bands 19 and 20 are disposed, there being one pneumatic tube 19$^b$, shown in substitute for the solid rubber band 19. These solid rubber bands or pneumatic tubes are arranged between the inner and outer rims, as shown, in order to give or yield, incident to the pressure applied upon the hub.

The inner face of the outer rim is provided with annular flanges 21, while the outer periphery of the inner rim is formed with annular flanges 22. These flanges of the inner and outer rims, at intervals, are provided with threaded apertures 24. 25 designates two annular rings, which are disposed upon each side of the wheel. These rings 25, at intervals, are also provided with apertures (which are designed to register with the apertures 24), and through the apertures 26 and the apertures 24 screws 27 are arranged. These screws are threaded in place. These annular rings 25 are designed for the purpose of holding the inner and outer rims rigidly spaced apart, in order to receive the solid rubber or pneumatic bands. The inner rim is provided with a plurality of elongated openings 28, which admit of the spokes 5. Upon examining the drawings, it will be clearly understood how the intermediate rim yields, when pressure is applied to the hub.

Between the resiliently mounted rim or band 15, and the inner annular band 19ª is arranged an annular band 30. This band 30 bears against the inner circumference of the solid rubber band 20. Between the annular band 30 (which is provided with elongated apertures 31 similar to the apertures or openings 28) and the inner band 19ª are dust guard plates 32. These plates 32 cover the registering end portions of the elongated apertures 31 and 28, in order to prevent dust and other foreign matter from entering the inner band 19ª. These plates 32 fit snugly about the spokes 5, in order that when the spokes move, they will move with them, thereby continually covering the registering elongated apertures 31 and 28.

The invention having been described, what is claimed as new and useful is:—

1. In a wheel, the combination of an inner and outer rim, of a resiliently mounted intermediate rim, an annular band surrounding the inner rim, said annular band and inner rim having registered elongated apertures, designed to receive the spokes, said spokes being secured to the resiliently mounted intermediate rim and plates movable with the spokes and arranged between the annular band and the inner rim.

2. In a wheel, the combination of inner and outer rims having annular flanges provided with apertures, of annular rings having apertures in registration with the first named apertures, screws penetrating the registering apertures, said inner rim having elongated openings, an annular band surrounding the inner rim between its flanges and provided with elongated openings in registration with the first named opening, an annular rim arranged intermediate the outer rim and the annular band, resilient means located on each face of the intermediate rim to coöperate between it and the outer rim and the annular band, in combination with spokes penetrating the said elongated openings and having restricted threaded ends penetrating the intermediate rim, nuts threaded to the restricted ends of the spokes, and plates arranged between the inner rim and the annular band to cover the registering elongated openings, and through which the spokes are vertically movable, said plates being movable with the spokes when the spokes are not moving vertically through them.

In testimony whereof I have signed my name to this specification in the presence of two subscribing witnesses.

MICHAEL C. SHEA.

Witnesses:
WILLIAM P. ROBINSON,
DELBERT H. FULLER.